United States Patent [19]

Tsujimoto et al.

[11] Patent Number: 4,579,920

[45] Date of Patent: Apr. 1, 1986

[54] POLYBUTADIENE HAVING HIGH 1,2 AND CIS-1,4 MICROSTRUCTURE CONTENTS

[75] Inventors: Nobuhiro Tsujimoto, Chiba; Michinori Suzuki, Ichihara; Norishige Kawaguchi, Ichihara; Tetuzi Nakazima, Ichihara, all of Japan

[73] Assignee: UBE Industries, Ltd., Yamaguchi, Japan

[21] Appl. No.: 679,649

[22] Filed: Dec. 10, 1984

[30] Foreign Application Priority Data

Oct. 2, 1984 [JP] Japan ............................... 59-205638

[51] Int. Cl.$^4$ ..................... C08F 4/62; C08F 136/06
[52] U.S. Cl. ..................... 526/138; 525/243; 525/316; 526/136; 526/141; 526/335; 526/340.4
[58] Field of Search ............ 526/90, 91, 92, 138, 526/136, 141, 335, 340.4

[56] References Cited

U.S. PATENT DOCUMENTS

| | | | |
|---|---|---|---|
| 3,299,031 | 1/1967 | Schon et al. | 526/340.4 |
| 3,445,446 | 5/1969 | Farrar | 526/340.4 |
| 3,502,637 | 3/1970 | Marullo et al. | 526/161 |
| 3,594,360 | 7/1971 | Gaeth | 526/340.4 |
| 3,966,697 | 6/1976 | Kampf et al. | 526/138 |

OTHER PUBLICATIONS

Gippin, I & EC Product Research and Development, vol. 1, No. 1, Mar. 1962, pp. 32–39.

*Primary Examiner*—Edward J. Smith
*Attorney, Agent, or Firm*—Sherman and Shalloway

[57] ABSTRACT

A process for producing polybutadiene of a high degree of polymerization having high 1,2 and cis-1,4 microstructure contents and a low trans-1,4 microstructure content, which comprises polymerizing 1,3-butadiene in the presence of a catalyst system composed of
(1) a halogen-containing organoaluminum compound,
(2) (a) a cobalt dithiocarbamate compound or (b) the reaction product of carbon disulfide, a secondary amine and a cobalt compound, and
(3) water.

The polybutadiene has for example
(A) a 1,2 microstructure content of 7 to 50%,
(B) a cis-1,4 microstructure content of at least 50%,
(C) a trans-1,4-microstructure content of at most 5%,
(D) an inherent viscosity, measured in toluene at 30° C., of at least 1, and
(E) a gel content of at most 0.3%.

11 Claims, No Drawings

POLYBUTADIENE HAVING HIGH 1,2 AND CIS-1,4 MICROSTRUCTURE CONTENTS

This invention relates to a process for producing polybutadiene of a high degree of polymerization having a high cis-1,4 microstructure content and a high 1,2 microstructure content and a low trans-1,4 microstructure content, polybutadiene having a very low gel content in addition to the aforesaid properties, a tire tread containing such polybutadiene as a rubber component, and to high-impact polystyrene.

It is well known that the reduction of the fuel cost and the increase of safety are important problems to be solved in the automobile industry, and various studies have been conducted on the improvement of automobile tires as means for solving these problems.

Generally, styrene butadiene rubber (SBR) and butadiene rubber (BR) are mainly used as a rubber material for automobile tire treads. The styrene butadiene rubber has rebound characteristics and a glass transition temperature which are satisfactory for practical application, and also possesses high wet skid resistance which is the resistance to slippage on a road surface wetted with water, etc. For these properties, SBR has been used in large quantities as a rubber material for treads. The butadiene rubber, on the other hand, has a much lower glass transition temperature (Tg) and higher rebound, i.e. lower rolling resistance than SBR. Because of the low rolling resistance, BR has been studied, and actually used, as a rubber material that contribute to a reduction in fuel cost.

The butadiene rubber, however, has the defect of inferior wet skid resistance. Accordingly, when the butadiene rubber is used as a rubber material for treads in order to realize the reduction of the fuel cost, the resulting tires have reduced wet skid resistance which leads to a decrease in the safety of automobiles. On the other hand, the styrene butadiene rubber has sufficiently high wet skid resistance but is limited in rebound and therefore cannot contribute to the reduction of the fuel cost. An attempt has been made to use these rubbers as a mixture in order to utilize the advantages of the respective rubbers and compensate for their shortcomings. In this case, however, there can only be obtained characteristics corresponding to the mixing ratio of the two.

A copolymer obtained by the radical polymerization of a styrene monomer in the presence of polybutadiene has improved impact strength in addition to the excellent properties of polystyrene, and is widely marketed as a high impact polystyrene resin.

Polybutadiene used to produce this high impact polystyrene resin is generally known to be obtained by a method involving using an alkyl lithium as a catalyst (see Japanese Patent Publications Nos. 38263/1970 and 38264/1970) or a method involving using a cobalt- or nickel-type catalyst (see Japanese Patent Publications Nos. 3894/1961, 8193/1962, 1243/1963 and 5474/1966). The former method gives polybutadiene having a cis-1,4 microstructure content of 30 to 35%, a trans-1,4 microstructure content of 50 to 60% and a 1,2 microstructure content of 10 to 20% (low cis polybutadiene), and the latter method gives polybutadiene having a cis-1,4 microstructure content of 96 to 98%, a trans-1,4 microstructure content of 1 to 2% and a 1,2 microstructure content of 1 to 2% (high cis polybutadiene).

Since the low cis polybutadiene is composed mainly of the trans-1,4 microstructure, its rubbery characteristics cannot be said to be sufficient. A polystyrene resin obtained by using the low cis polybutadiene and a styrene monomer is not entirely satisfactory in regard to impact strength.

The high cis polybutadiene has low reactivity (graft reactivity) with the styrene monomer because its 1,2 microstructure content is as low as 1 to 2%. A polystyrene resin obtained by using the high cis polybutadiene and the styrene monomer is neither entirely satisfactory in regard to impact strength.

Polybutadiene used as a material for a high impact polystyrene resin should have a high 1,2 microstructure content and a high cis-1,4 microstructure content.

It is also important that polybutadiene used as a material for the high impact polystyrene resin should have a high molecular weight in addition to the high 1,2 microstructure content and cis-1,4 microstructure content. Low-molecular-weight polybutadiene gives a polystyrene resin which is difficult of exhibiting the rubbery properties of polybutadiene and is not entirely satisfactory in regard to impact strength.

It is an object of this invention therefore to provide a process for producing polybutadiene of a high degree of polymerization having high 1,2 and cis-1,4 microstructure contents and a low trans-1,4 microstructure content by using a novel catalyst system.

Another object of this invention is to provide polybutadine of a high degree of polymerization having a low gel content produced by using a novel catalyst system.

Still another object of this invention is to provide polybutadiene for tire treads capable of giving a tire which has high wet skid resistance and rebound and therefore has high safety and contributes to the saving of the fuel cost.

Yet another object of this invention is to provide polybutadiene for high-impact polystyrene having excellent Izod impact strength and markedly improved Du Pont impact strength.

Further objects and advantages of this invention will become apparent from the following description.

According to this invention, these objects and advantage of the invention are achieved by a process for producing polybutadiene of a high degree of polymerization having high 1,2 and cis-1,4 microstructure contents and a low trans-1,4 microstructure content, which comprises polymerizing 1,3-butadiene in the presence of a catalyst system composed of
(1) a halogen-containing organoaluminum compound,
(2) (a) a cobalt dithiocarbamate compound or (b) the reaction product of carbon disulfide, a secondary amine and a cobalt compound, and
(3) water,
to form polybutadiene having
(A) a 1,2 microstructure content of 7 to 50%,
(B) a cis-1,4 microstructure content of at least 50%,
(C) a trans-1,4-microstructure content of at most 5%, and
(D) an inherent viscosity, measured in toluene at 30° C., of at least 1.

The catalyst system used in this invention is composed of (1) a halogen-containing organoaluminum compound, (2) (a) a cobalt dithiocarbamate compound or (b) the reaction product of carbon disulfide, a secondary amine and a cobalt compound, and water.

Examples of preferred halogen-containing organoaluminum compounds are those represented by the following general formula (I)

$$AlR_nX_{3-n} \tag{I}$$

wherein R represents an alkyl group having 1 to 8 carbon atom, a cycloalkyl group, or a phenyl group, X represents a halogen atom, and n is a number of 1.5 to 2.

The alkyl group having 1 to 8 carbon atoms in formula (I) may be linear or branched, and includes, for example, methyl, ethyl, n-propyl, iso-propyl, n-butyl, iso-butyl, sec-butyl, n-pentyl, n-hexyl and n-octyl.

Examples of the cycloalkyl group are cyclopentyl and cyclohexyl groups.

X represents a halogen atom such as chlorine or bromine.

Examples of the halogen-containing organoaluminum compound of formula (I), therefore, include dialkyl aluminum halides such as diethyl aluminum monochloride, diethyl aluminum monobromide and diisobutyl aluminum monochloride; and alkyl aluminum sesquihalides such as ethyl aluminum sesquichloride.

A preferred example of the cobalt dithiocarbamate compound (a) is a compound repesented by the following general formula (II)

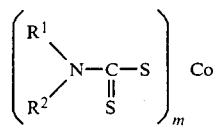

$$\left( \begin{array}{c} R^1 \\ \phantom{R}\diagdown \\ \phantom{RR}N{-}C{-}S \\ \phantom{R}\diagup \phantom{NNN}\| \\ R^2 \phantom{NNNN} S \end{array} \right)_m Co \tag{II}$$

wherein $R^1$ and $R^2$ are identical or different and each represents an alkyl group having 1 to 20 carbon atoms, a phenyl group or a cycloalkyl group, or $R^1$ and $R^2$ may be bonded to each other to form a heterocyclic ring together with the nitrogen atom to which they are bonded, and m is a number of 2 to 3.

In formula (II), the alkyl group having 1 to 20 carbon atoms may be linear or branched, and includes, for example, methyl, ethyl, n-propyl, iso-propyl, n-butyl, iso-butyl, sec-butyl, n-pentyl, n-hexyl, n-octyl, n-nonyl, n-decyl, n-dodecyl, n-pentadecyl, n-octadecyl and n-eicosyl.

Cyclopentyl and cyclohexyl groups may be cited as examples of the cycloalkyl group.

Examples of the heterocyclic ring formed by the bonding of $R^1$ and $R^2$ together with the nitrogen atom are piperidine or pipecoline.

The cobalt in formula (II) may be divalent or trivalent.

In formula (II), $R^1$ and $R^2$ are identical or different, and preferably represent an alkyl group having 1 to 12 carbon atoms, especially preferably an alkyl group having 1 to 6 carbon atoms. Preferably, the compound of formula (II) is cobalt dithiocarbamate in which cobalt is trivalent, or a mixture of cobalt dithiocarbamates in which cobalt is trivalent as a main component and cobalt dithiocarbamate in which cobalt is divalent.

The cobalt dithiocarbamate compound of formula (II) is a compound known per se, and can be produced by reacting a sodium dialkyldithiocarbamate with cobalt chloride.

Detailed methods of producing the cobalt dithiocarbamate compounds are described, for example in M. Delepine, Bull. Soc. Chim., [4], 3, 643–652 (C.A. 2, 2691), L. Compin, Bull. Soc. Chim., 27, 464–469 (1920) (C.A. 14, 3025), and "Shin Jikken Kagaku Koza 8" (New Lecture on Experimental Chemistry), page 1582, published by Maruzen Co. (especially in regard to the production of cobalt (III) dithiocarbamate).

Examples of the cobalt dithiocarbamate compound of formula (II) that can be used preferably in this invention include cobalt dimethyldithiocarbamate, cobalt diethyldithiocarbamate, cobalt dipropyldithiocarbamate, cobalt dibutyldithiocarbamate, cobalt dicyclohexyldithiocarbamate, cobalt pentamethylenedithiocarbamate and cobalt pipecolyldithiocarbamate (cobalt methylpentamethylenedithiocarbamate).

The reaction product (b) of carbon disulfide, a secondary amine and a cobalt compound may be used as the component (2) of the catalyst system used in this invention instead of the above cobalt dithiocarbamate compound (a). The reaction product (b) can be obtained by intimately contacting carbon disulfide, the secondary amine and the cobalt compound in the presence of an organic reaction medium.

The secondary amine is preferably a compound represented by the following formula (III)

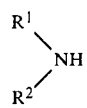

$$\begin{array}{c} R^1 \\ \phantom{R}\diagdown \\ \phantom{RR}NH \\ \phantom{R}\diagup \\ R^2 \end{array} \tag{III}$$

Examples of the compound of formula (III) are dimethylamine, diethylamine, dipropylamine, dibutylamine, dihexylamine, dioctylamine, piperidine and pipecoline.

Examples of the cobalt compound which can be used include organic acid salts such as cobalt acetate, cobalt octenate, cobalt naphthenate and cobalt stearate; complexes such as cobalt tris-acetylacetonate and cobalt bis-acetylacetonate; and inorganic acid salts such as cobalt chloride, cobalt bromide, cobalt iodide, cobalt nitrate and cobalt carbonate.

Examples of preferred organic reaction media used in the reaction of carbon disulfide, the secondary amine and the cobalt compound are aromatic hydrocarbons such as benzene, toluene and xylene, aliphatic hydrocarbons such as hexane and heptane, and halogenated hydrocarbons such as methylene chloride, chloroform, carbon tetrachloride and chlorobenzene. Diene monomers, olefin monomers, or aromatic vinyl monomers may be present in the reaction system.

The cobalt compound is used preferably in a concentration of not more than 0.2 mole/liter, more preferably not more than 0.1 mole/liter.

The mole ratio of the cobalt compound to the secondary amine is preferably from 1:1 to 1:6, more preferably from 1:1 to 1:4. The mole ratio of the secondary amine to carbon disulfide is preferably at least 1:0.5, more preferably from 1:0.5 to 1:5. By changing the ratios of the secondary amine and carbon disulfide to the cobalt compound, the 1,2 microstructure content of the resulting polybutadiene can be changed.

In performing the reaction, there is no particular restriction on the sequence of adding the cobalt compound, carbon disulfide and the secondary amine. Preferably, the reaction temperature is usually 10° to 40° C. The reaction time is neither restricted in particular. However, when the cobalt compound is insoluble in the solvent used in the reaction, a slightly longer period of time is required for the cobalt compound to react and dissolve in it.

In the polymerization of 1,3-butadiene in the presence of the catalyst system of this invention, the cobalt dithiocarbamate compound (a) or the reaction product (b) of carbon disulfide, the secondary amine and the cobalt compound is used preferably in an amount of 0.001 to 0.5 millimoles, as cobalt, per mole of 1,3-butadiene. The mole ratio of cobalt of the cobalt dithiocarbamate compound (a) or the reaction product (b) to the halogen-containing organoaluminum compound (1) is preferably from 1:5 to 1:2000, more preferably from 1:5 to 1:1000, especially preferably from 1:10 to 1:350.

In the catalyst system of this invention, water is an essential component for the smooth proceeding of the polymerization reaction. The mole ratio of water to the halogen-containing organoaluminum compound ($H_2O$/Al mole ratio) is preferably from 0.01:1 to 0.7:1, especially preferably from 0.1:1 to 0.6:1. The 1,2 microstructure content of the resulting polybutadiene can be increased by increasing the $H_2O$/Al mole ratio of the catalyst system.

As a polymerization solvent, there may be used an aromatic hydrocarbon such as benzene, toluene or xylene, an aliphatic hydrocarbon such as butane, butene, n-hexane or n-heptane, an alicyclic hydrocarbon such as cyclohexane or methyl cyclohexane and a halogenated hydrocarbon such as methylene chloride or chlorobenzene.

In performing the polymerization, a molecular weight controlling agent, a radical scavenger, etc. may be used. The molecular weight controlling agent is, for example, cyclooctadiene, 1,2-butadiene or allene, and 1,4-benzoquinone may be used as the radical scavenger. The preferred amount of the radical scavenger is 0.2 to 20 moles, especially 0.5 to 10 moles, per mole of the cobalt component. Polybutadiene obtained by using the radical scavenger has an increased content of 1,2 microstructure or is obtained in a larger amount than polybutadiene having the same 1,2-microstructure content but obtained without using the radical scavenger.

Preferably, the polymerization of 1,3-butadiene is carried out at a temperature of 5° to 80° C., especially 20° to 70° C. The polymerization time is usually 10 minutes to 10 hours.

In the preparation of the catalyst system used in this invention, the contacting of the cobalt dithiocarbamate compound (a) or the reaction product (b) with the halogen-containing organoaluminum compound is desirably effected in the presence of 1,3-butadiene.

When the contacting of the components (a) or (b) with the halogen-containing organoaluminum compound is carried out in the absence of 1,3-butadiene, it is desirably carried out under conditions in which the aging of the two components does not so much proceed, for example at a temperature of not more than 50° C. with a contact time of within 5 minutes in the absence of 1,3-butadiene.

Preferably, the process of this invention is carried out, for example, by dissolving water in a mixture of 1,3-butadiene and the solvent, and initiating the polymerization of 1,3-butadiene by simultaneously adding the cobalt dithiocarbamate compound (a) or the reaction product (b) and the halogen-containing organoaluminum compound; or by initiating the polymerization of 1,3-butadiene by adding the halogen-containing organoaluminum compound or the cobalt dithiocarbamate compound (a) or the reaction product (b) in the last place.

Except for the aforesaid points, the polymerization reaction in accordance with this invention can be performed by conventional known reaction operations for the polymerization of 1,3-butadiene.

Generally, the 1,2 microstructure content of the resulting polybutadiene becomes higher as the polymerization temperature is lower or the mole ratio of the halogen-containing organoaluminum compound to the cobalt dithiocarbamate compound (a) or the reaction product (b) (Al/Co) is lower. By adjusting the polymerization temperature and the Al/Co mole ratio, polybutadiene having a high 1,2 microstructure content can be easily obtained.

With the catalyst system containing the reaction product (b), the 1,2 microstructure content of the resulting polybutadiene can be changed also by changing the ratio of the cobalt compound, carbon disulfide and the secondary amine in the reaction product (b). For example, the 1,2 microstructure content can be increased by adjusting the mole ratio of carbon disulfide to the secondary amine to 1:1 and increasing the amounts of these compounds over the cobalt compound.

Furthermore, the 1,2 microstructure content of polybutadiene can be increased by increasing the mole ratio of water to the halogen-containing organoaluminum compound ($H_2O$/Al mole ratio).

After the polymerization, an antioxidant may be added as desired to the reaction mixture. Then, polybutadiene can be taken out from the reaction mixture by using known methods, for example by treating the reaction mixture with alcohols, hot water or cold water.

Thus, the process of this invention can easily give polybutadiene having (A) a 1,2 microsructure content of 7 to 50%, especially 10 to 50%,
(B) a cis-1,4 microstructure content of at least 50%, especially 50 to 88%,
(C) a trans-1,4 microstructure content of at most 5%, especially not more than 2%, and
(D) an inherent viscosity, measured in toluene at 30° C., of at least 1, especially 1 to 10.

In addition to the aforesaid characteristics (A) to (D), polybutadiene produced by the process of this invention has (E) a gel content of at most 0.3%, especially not more than 0.03%.

Since the polybutadiene obtained by this invention has excellent wet skid resistance and rebound, a rubber material suitable for automobile tire treads can be produced by adding suitable compounding chemicals and additives to it or to a blend of it with styrene butadiene rubber, and vulcanizing the composition.

A superior high-impact polystyrene resin can be produced, for example, by radical polymerization of a mixture composed of 2 to 25 parts by weight, preferably 2 to 20 parts by weight, of the polybutadiene of this invention particularly having a 1,2 microstructure content of 10 to 25% and 75 to 98 parts by weight (preferably 80 to 98 parts by weight) of styrene by a bulk method (continuous method) or a bulk-suspension method (batch method). Methods for production of high-impact polystyrene resin are known per se, and reference may be made to the methods described, for example, in Japanese Patent Publications Nos. 16185/1966 and 447/1969.

The 1,2 microstructure content, cis-1,4 microstructure content and trans-1,4 microstructure content (these are inclusively referred to as the microstructure content) are values calculated from the IR spectrum and NMR spectrum of polybutadiene. The inherent viscosity [η] is a value measured in toluene at 30° C.

The gel content of the polymer is determined as follows: About 4 g of the polymer is dissolved in 200 ml of toluene at 25° C., and the solution is filtered through a 400-mesh wire gauze. The wire gauze is washed with fresh toluene and dried in vacuum at 80° C. for 5 hours. The gel content is calculated from the weight increase of the wire gauze.

The following Examples and Comparative Examples illustrate the present invention more specifically.

EXAMPLES 1-3

The air inside a 1-liter autoclave was replaced by dry nitrogen gas, and 200 ml of dehydrated benzene and 62 g of 1,3-butadiene were put in the autoclave. Furthermore, a predetermined amount (indicated in Table 1) of water was added. The mixture was stirred at 30° C. for 30 minutes to dissolve water. Then, 0.78 millimole of diethyl aluminum monochloride was added, and 0.007 millimole of cobalt diethyldithiocarbamate was also introduced at 60° C. to initiate the polymerization of 1,3-butadiene. The polymerization was carried out by stirring the reaction mixture at 60° C. for 30 minutes.

The cobalt diethyldithiocarbamate had been obtained by reacting sodium diethyldithiocarbamate with cobalt chloride, drying the resulting precipitate and recovering a benzene-soluble portion of the precipitate. The elemental analysis values of the benzene-soluble portion were as follows: C 36.99%, H 6.00%, N 8.26%. Cobalt in the compound was trivalent.

After the polymerization, 5 ml of methanol containing a small amount of 2,6-di-t-butyl-p-cresol was added to the reaction mixture to stop the polymerization reaction. Methanol (300 ml) was further added to precipitate the resulting polymer. The polymer was dried under reduced pressure at room temperature for 24 hours.

The microstructure content, inherent viscosity and gel content of the polymer were measured, and the results are given in Table 1.

TABLE 1

| Example | Water (millimoles) | Amount yielded (g) | [η] | Microstructure content (%) cis-1,4 | trans-1,4 | 1,2 | Gel content (%) |
|---|---|---|---|---|---|---|---|
| 1 | 0.15 | 24.3 | 5.27 | 89.0 | 1.0 | 10.0 | 0.104 |
| 2 | 0.30 | 24.0 | 5.29 | 83.2 | 0.8 | 16.0 | 0.140 |
| 3 | 0.39 | 22.5 | 5.39 | 80.1 | 0.6 | 19.3 | 0.252 |

In Table 1 and other tables, cis-1,4, trans-1,4 and 1,2 respectively mean cis-1,4 microstructure content, trans-1,4 microstructure content and 1,2 microstructure content.

EXAMPLE 4

Water was dissolved in a mixture of benzene and butadiene in accordance with the procedure of Example 2, and then cobalt diethyldithiocarbamate was added. Then, diethyl aluminum monochloride was added at 60° C., and the same polymerization as in Example 2 was carried out, and the resulting polymer was taken out. The microstructure content, inherent viscosity and gel content of the polymer are shown in Table 2.

EXAMPLE 5

Water was dissolved in a mixture of benzene and butadiene in accordance with the procedure of Example 2, and cobalt diethyldithiocarbamate and diethyl aluminum monochloride were simultaneously added at 60° C. Then, the same polymerization reaction as in Example 2 was carried out, and the resulting polymer was taken out. The microstructure content, inherent viscosity and gel content of the resulting polymer are shown in Table 2.

TABLE 2

| Example | Water (millimoles) | Amount yielded (g) | [η] | Microstructure content (%) cis-1,4 | trans-1,4 | 1,2 | Gel content (%) |
|---|---|---|---|---|---|---|---|
| 4 | 0.30 | 17.6 | 4.85 | 86.8 | 0.5 | 12.7 | 0.265 |
| 5 | 0.30 | 15.2 | 4.20 | 87.7 | 1.0 | 11.3 | 0.260 |

EXAMPLES 6-8

1,3-Butadiene was polymerized in the same way as in Example 2 except that the amount of the cobalt diethyldithiocarbamate was changed as shown in Table 3. The resulting polymer was taken out and its microstructure content, inherent viscosity and gel content were measured. The results are shown in Table 3. For easy reference, the data obtained in Example 2 are also given in Table 3.

TABLE 3

| Example | Co (millimoles) | Amount yielded (g) | [η] | Microstructure content (%) cis-1,4 | trans-1,4 | 1,2 | Gel content (%) |
|---|---|---|---|---|---|---|---|
| 6 | 0.0035 | 17.0 | 6.83 | 87.6 | 0.8 | 11.6 | 0.132 |
| 2 | 0.007 | 24.0 | 5.29 | 83.2 | 0.8 | 16.0 | 0.141 |
| 7 | 0.014 | 24.5 | 3.17 | 75.5 | 0.5 | 24.0 | 0.100 |
| 8 | 0.021 | 24.9 | 3.10 | 70.4 | 0.5 | 29.1 | 0.105 |

EXAMPLES 9-10

1,3-Butadiene was polymerized in the same way as in Example 2 except that the amount of dehydrated benzene was changed to 250 ml, the amount of 1,3-butadiene was changed to 31 g, and the amount of cobalt diethyldithiocarbamate was changed as shown in Table 4. The resulting polymer was taken out, and its microstructure content, inherent viscosity and gel content were measured. The results are shown in Table 4.

TABLE 4

| Example | Co (millimoles) | Amount yielded (g) | [η] | Microstructure content (%) cis-1,4 | trans-1,4 | 1,2 | Gel content (%) |
|---|---|---|---|---|---|---|---|
| 9 | 0.007 | 9.7 | 3.05 | 75.2 | 0.5 | 24.3 | 0.030 |
| 10 | 0.021 | 14.5 | 2.29 | 68.0 | 0.2 | 31.8 | 0.025 |

EXAMPLES 11-14

1,3-Butadiene was polymerized in the same way as in Example 2 except that the kind of the cobalt dithiocarbamate compound was changed as shown in Table 5. The resulting polymer was taken out, and its microstructure, inherent viscosity and gel content were measured. The results are shown in Table 5.

TABLE 5

| Example | Kind of Co | Amount yielded (g) | [η] | cis-1,4 | trans-1,4 | 1,2 | Gel content |
|---|---|---|---|---|---|---|---|
| 11 | A | 11.7 | 4.53 | 80.4 | 0.8 | 18.8 | 0.080 |
| 12 | B | 23.8 | 4.07 | 78.5 | 0.6 | 20.9 | 0.121 |
| 13 | C | 17.0 | 4.68 | 80.3 | 0.7 | 19.0 | 0.101 |
| 14 | D | 21.6 | 4.52 | 81.5 | 0.5 | 18.0 | 0.110 |

The kinds of Co represented by A, B, C and D were as follows:

A: Cobalt dimethyldithiocarbamate
B: Cobalt di-n-butyldithiocarbamate
C: Cobalt pentamethylenedithiocarbamate
D: Cobalt pipecolyldithiocarbamate These compounds were synthesized in the same way as in the preceding Examples, and the benzene-soluble portions were used.

EXAMPLES 15–17

1,3-Butadiene was polymerized in the same way as in Examples 1 to 3 except that the amount of water added was changed as indicated in Table 6, the amount of diethyl aluminum monochloride was changed to 1.56 millimoles, cobalt diethyldithiocarbamate was added at 30° C., and the polymerization temperature was changed to 30° C. The resulting polymer was taken out, and its microstructure content, inherent viscosity and gel content were measured. The results are shown in Table 6.

TABLE 6

| Example | Water (millimoles) | Amount yielded (g) | [η] | cis-1,4 | trans-1,4 | 1,2 | Gel content (%) |
|---|---|---|---|---|---|---|---|
| 15 | 0.15 | 18.5 | 6.18 | 67.5 | 0.0 | 32.5 | 0.005 |
| 16 | 0.30 | 18.2 | 6.12 | 63.1 | 0.2 | 36.7 | 0.005 |
| 17 | 0.45 | 11.0 | 6.22 | 60.4 | 1.1 | 38.5 | 0.021 |

EXAMPLES 18–19

1,3-Butadiene was polymerized in the same way as in Example 16 except that the amount of diethylaluminum monochloride was changed as indicated in Table 7. The resulting polymer was taken out, and its microstructure content, inherent viscosity and gel content were measured. The results are shown in Table 7.

TABLE 7

| Example | Al (millimoles) | Amount yielded (g) | [η] | cis-1,4 | trans-1,4 | 1,2 | Gel content (%) |
|---|---|---|---|---|---|---|---|
| 18 | 0.78 | 11.0 | 6.63 | 58.6 | 0.0 | 41.4 | 0.001 |
| 19 | 7.80 | 14.1 | 6.31 | 79.3 | 0.5 | 20.2 | 0.009 |

Al in this and other tables means diethylaluminum monochloride.

EXAMPLE 20

1,3-Butadiene was polymerized in the same way as in Example 19 except that the amount of water was changed to 0.90 millimole. The resulting polymer was taken out, and its microstructure, inherent viscosity and gel content were measured. The results are shown in Table 8.

TABLE 8

| Example | Water (millimoles) | Amount yielded (g) | [η] | cis-1,4 | trans-1,4 | 1,2 | Gel content (%) |
|---|---|---|---|---|---|---|---|
| 20 | 0.90 | 14.2 | 5.79 | 64.5 | 0.6 | 34.9 | 0.010 |

EXAMPLE 21

The air inside a 5-liter autoclave was replaced by dry nitrogen gas, and 1300 ml of dehydrated benzene and 420 g of 1,3-butadiene were put into it. Water (1.4 millimoles) was added, and the mixture was stirred at 30° C. for 30 minutes to dissolve water. Then, 5.2 millimoles of diethyl aluminum monochloride and 56.0 millimoles of 1,5-cyclooctadiene were added, and further 0.2 millimole of cobalt diethyldithiocarbamate was added at 50° C. to initiate the polymerization of 1,3-butadiene. The polymerization reaction was carried out by stirring the reaction mixture at 50° C. for 30 minutes.

After the polymerization, 30 ml of methanol containing a small amount of 2,6-di-t-butyl-p-cresol was added to stop the polymerization reaction. Furthermore, 2 liters of methanol was added to precipitate the resulting polymer. The polymer was dried under reduced pressure at room temperature for 24 hours. The microstructure content, inherent viscosity and gel content of the resulting polymer were measured, and the results are shown in Table 9.

TABLE 9

| Example | Al (millimoles) | Amount yielded (g) | [η] | cis-1,4 | trans-1,4 | 1,2 | Gel content (%) |
|---|---|---|---|---|---|---|---|
| 21 | 5.2 | 137 | 2.50 | 59.7 | 0.6 | 39.7 | 0.040 |

EXAMPLES 22–23

1,3-Butadiene was polymerized in the same way as in Example 21 except that the temperature at which cobalt diethyldithiocarbamate was added and the polymerization temperature were changed to 60° C., and the amount of cobalt diethyldithiocarbamate was changed as indicated in Table 10.

The resulting polymer was taken out, and its microstructure content, inherent viscosity and gel content were measured. The results are shown in Table 10.

TABLE 10

| Example | Co (millimoles) | Amount yielded (g) | [η] | cis-1,4 | trans-1,4 | 1,2 | Gel content (%) |
|---|---|---|---|---|---|---|---|
| 22 | 0.094 | 135 | 2.35 | 73.3 | 0.7 | 26.0 | 0.075 |
| 23 | 0.047 | 123 | 2.11 | 83.0 | 0.8 | 16.2 | 0.062 |

EXAMPLES 24–25

1,3-Butadiene was polymerized in the same way as in Example 21 except that the amount of diethylaluminum monochloride was changed to 6.0 millimoles, the temperature at which cobalt diethyldithiocarbamate was added and the polymerization temperature were changed to 60° C., and the amount of cobalt diethyldithiocarbamate was changed as indicated in Table 11. The resulting polymer was taken out and its microstructure content, inherenet viscosity and gel content were measured. The results are shown in Table 11.

TABLE 11

| Example | Co (milli-moles) | Amount yielded (g) | [η] | Microstructure content (%) | | | Gel content (%) |
|---|---|---|---|---|---|---|---|
| | | | | cis-1,4 | trans-1,4 | 1,2 | |
| 24 | 0.094 | 142 | 2.13 | 79.2 | 0.6 | 20.2 | 0.074 |
| 25 | 0.047 | 132 | 1.87 | 86.7 | 0.8 | 12.5 | 0.070 |

EXAMPLES 26-28 AND COMPARATIVE EXAMPLES 1-2

Each of the polybutadienes produced in Examples 21 to 23 was vulcanized at 150° C. for 30 minutes in accordance with the following recipe. The various properties of the vulcanizate were measured.

For comparison, commercial high cis polybutadiene rubber (high cis BR: cis-1,4 microstructure content 97.0%, trans-1,4 microstructure content 1.0%, 1,2 microstructure content 2.0%, [η]=2.0) and commercial styrene butadiene rubber (SBR: styrene monomer unit content=23.5%) were vulcanized in the same way as above (the vulcanization time for SBR was 60 minutes). The properties of the vulcanizates were also measured.

| Vulcanization recipe | Parts by weight |
|---|---|
| Rubber | 100 |
| HAF carbon | 50 |
| High aromatic oil | 10 |
| Zinc oxide | 5 |
| Stearic acid | 2 |
| Antioxidant | 1 |
| Vulcanization accelerator | 1 |
| Sulfur | 1.5 |

The antioxidant used was Antigen AS made by Sumitomo Chemical Co., Ltd. The vulcanization accelerator was N-cyclohexyl-2-benzothiazole sulfenamide.

The results of the measurement are shown in Table 12.

TABLE 12

| Example | Rubber used | Wet skid resistance (relative value) | Rebound (relative value) | Hardness |
|---|---|---|---|---|
| 26 | Example 21 | 50 (152) | 59 (95) | 62 |
| 27 | Example 22 | 42 (127) | 60 (97) | 60 |
| 28 | Example 23 | 39 (118) | 61 (98) | 58 |
| Comp. Ex. 1 | High cis BR | 33 (100) | 62 (100) | 59 |
| Comp. Ex. 2 | SBR | 51 (155) | 47 (76) | 60 |

The properties given in Table 12 were measured by the following methods.

(1) Wet skid resistance

Measured on a wet ground glass surface at room temperature (25° C.) by means of a portable skid tester made by Stanley Co., Britain.

(2) Rebound

Measured at room temperature (25° C.) in accordance with JIS K-6301.

(3) Hardness

Measured by means of a JIS hardness tester (Shore A).

The relative values given in Table 12 were based on the measured values of a rubber obtained by using high cis BR as a material which were each taken as 100.

EXAMPLES 29-31 AND COMPARATIVE EXAMPLES 3-4

Using each of the polybutadienes produced in Examples 23 to 25, a high-impact polystyrene resin was produced by the method described below, and its impact strength was tested.

For comparison, high-impact polystyrene resins were produced by the same method using commercial high cis polybutadiene (high cis BR: cis-1,4 microstructure content 95.9%, trans-1,4 microstructure content 2.0%, 1,2 microstructure content 2.1%, [η]=1.8) and commercial low cis polybutadiene rubber (low cis BR: cis-1,4 microstructure colntent 34.0%, trans-1,4 microstructure conent 54.0%, 1,2 microstructure 12.0%, [η]=1.9), and their impact strnegths were also tested.

Production of the high-impact polystyrene resin:

The air inside a 1-liter separable flask was replaced by nitrogen gas, and 570 g of styrene and 30 g (5% by weight) of polybutadiene were added and dissolved. Then, 0.3 g of n-dodecylmercaptan and 11.4 g of n-butyl stearate were added. The mixture was stirred at 120° C. until the polymerization conversion of styrene reached 30%. The reaction mixture was added to 600 ml of a 0.5% by weight aqueous solution of polyvinyl alcohol, and the mixture was injected into an autoclave. Benzoyl peroxide (0.93 g) and 0.93 g of dicumyl peroxide were added, and the mixture was stirred at 100° C. for 2 hours, then at 125° C. for 3 hours and further at 140° C. for 2 hours to perform the polymerization. The resulting polymer in the form of beads were collected from the reaction mixture by filtration, washed with water, dried, and then pelletized in an extruder to give 500 g of a polystyrene resin.

The properties of the polystyrene were measured, and the results are shown in Table 13.

TABLE 13

| Example | Rubber used | Izod imapct strength (notched) (kg-cm/cm) | Du Pont impact strength (kg-cm) |
|---|---|---|---|
| 29 | Example 23 | 8.9 | 25 |
| 30 | Example 24 | 8.5 | 24 |
| 31 | Example 25 | 8.8 | 23 |
| Comp. Ex. 3 | High cis BR | 8.5 | 19 |
| Comp. Ex. 4 | Low cis BR | 7.5 | 20 |

The impact strengths in these and other examples were measured by the following methods.

(1) Izod impact strength

Measured in accordance with ASTM D256.

(2) Du Pont impact strength

A 2 mm thick sheet was press-formed and a test sample was taken from it. Its Du Pont impact strength was measured under the following conditions.

Falling impact rod diameter: ½ inch
Bearer diameter: ½ inch
Load: 500 g

EXAMPLES 32-35

The air inside a 1.5-liter autoclave was replaced by dry nitrogen gas, and then 717 ml of dehydrated benzene and 176 g of 1,3-butadiene were put into it. Water (1.33 millimoles) was added and the mixture was stirred at 30° C. for 30 minutes to dissolve water. Then, 4.0 millimoles of diethyl aluminum monochloride and 49 millimoles of 1,5-cyclooctadiene were added. The temperature was raised to 60° C., and 0.07 millimole of cobalt diethyldithiocarbamate was added. One minute later, a predetermined amount (given in Table 14) of 1,4-benzoquinone was added, and the mixture was stirred at 60° C. for a predetermined polymerization time (indicated in Table 14).

After the polymerization, 15 ml of methanol containing a small amount of 2,6-di-t-butyl-p-cresol was added to the reaction solution to stop the polymerization. The solution was added to 1 liter of methanol to precipitate the resulting polymer. The polymer was dried under reduced pressure for 24 hours, and its microstructure content, inherent viscosity and gel content were measured. The results are shown in Table 14.

TABLE 14

| Example | 1,4-Benzoquinone (mM) | Polymerization time (min.) | Amount yielded (g) | [η] | Microstructure content (%) | | | Gel content (%) |
|---|---|---|---|---|---|---|---|---|
| | | | | | cis-1,4 | trans-1,4 | 1,2 | |
| 32 | 0.035 | 30 | 48 | 2.42 | 72.7 | 0.4 | 26.8 | 0.010 |
| 33 | 0.035 | 300 | 74 | 2.47 | 71.7 | 0.6 | 27.7 | 0.013 |
| 34 | 0.070 | 30 | 58 | 2.24 | 74.1 | 0.5 | 25.4 | 0.008 |
| 35 | 0.070 | 300 | 82 | 2.19 | 74.0 | 0.9 | 25.1 | 0.010 |

EXAMPLES 36–37

A 1,3-butadiene solution having the following composition by weight was polymerized.

1,3-Butadiene—24.0%
cis-2-Butene—19.5%
trans-2-Butene—6.3%
iso-Butene—0.5%
1-Butene—0.2%
Ethane—0.1%
Benzene—49.4%

The air inside a 1.5-liter autoclave was replaced by dry nitrogen gas, and 1000 ml of the above 1,3-butadiene solution was put into it. Water (1.5 millimoles) was added, and the mixture was stirred at 30° C. for 30 minutes to dissolve water. Then, 3.3 millimoles of diethyl aluminum monochloride and 20 millimoles of 1,5-cyclooctadiene were added. The temperature was raised to 60° C., and a predetermined amount described in Table 15 of cobalt diethyldithiocarbamate was added. One minute later, 0.074 mM of 1,4-benzoquinone was added, and the mixture was stirred at 60° C. for 62 minutes.

After the polymerization, the reaction mixture was worked up in the same way as in Examples 32–35.

The results are shown in Table 15.

TABLE 15

| Example | 1,4-Benzoquinone (mM) | Cobalt (mM) | Amount yielded (g) | [η] | Microstructure content (%) | | | Gel content (%) |
|---|---|---|---|---|---|---|---|---|
| | | | | | cis-1,4 | trans-1,4 | 1,2 | |
| 36 | 0.074 | 0.035 | 60 | 2.20 | 84.1 | 0.9 | 15.0 | 0.005 |
| 37 | 0.074 | 0.070 | 72 | 2.24 | 79.4 | 1.0 | 19.6 | 0.015 |

EXAMPLES 38–40

(1) To 20 ml of a benzene solution of cobalt octenate (0.035 mole/liter) was added 2.2 ml of a benzene solution of carbon disulfide (0.7 mole/liter). Then, 2.2 ml of a benzene solution of diethylamine (0.7 mole/liter) was added with stirring. The mixture was stirred at room temperature (25° C.) for 1 day. Then, 24.4 ml of the resulting solution was diluted with 175.6 ml of benzene to prepare a solution of catalyst component (b) (0.0035 mole/liter; mole ratio 1:2.2:2.2).

(2) The air inside a 1-liter autoclave was replaced by dry nitrogen gas, and 213 ml of dehydrated benzene and 54 g of 1,3-butadiene were added. Then, a predetermined amount (indicated in Table 16) of water was added. The mixture was stirred at 30° C. for 30 minutes to dissolve water. Then, 0.9 millimole of diethylaluminum monochloride was added, and the temperature was raised to 60° C. Three milliliters (0.0105 millimole based on cobalt octenate) of the above catalyst component (b) solution was added, and the mixture was stirred at 60° C. for 30 minutes to perform polymerization.

After the polymerization, 5 ml of methanol containing a small amount of 2,6-di-t-butyl-p-cresol was added to stop the polymerization reaction. Further, 300 ml of methanol was added to precipitate the resulting polymer. The polymer was dried at room temperature under reduced pressure for 24 hours.

The microstructure, inherent viscosity and gel content of the resulting polymer were measured, and the results are shown in Table 16.

TABLE 16

| Example | Water (millimoles) | Amount yielded (g) | [η] | Microstructure content (%) | | | Gel content (%) |
|---|---|---|---|---|---|---|---|
| | | | | cis-1,4 | trans-1,4 | 1,2 | |
| 38 | 0.3 | 27.7 | 4.70 | 83.5 | 0.8 | 15.7 | 0.092 |
| 39 | 0.36 | 27.6 | 5.50 | 80.3 | 0.7 | 19.0 | 0.115 |
| 40 | 0.45 | 11.0 | 4.77 | 76.7 | 1.0 | 22.3 | 0.230 |

EXAMPLES 41–49

1,3-Butadiene was polymerized in the same way as in Example 39 except that the mole ratio of the ingredients of the catalyst component (b) were changed as indicated in Table 17. The results are shown in Table 17.

TABLE 17

| Example | Mole ratio of the ingredient of the catalyst component (b) | | | | Yield (g) | [η] | Microstructure content (%) | | | Gel content (%) |
|---|---|---|---|---|---|---|---|---|---|---|
| | Cobalt octenate | Carbon disulfide | Diethylamine | Carbon disulfide/diethyl amine | | | cis-1,4 | trans-1,4 | 1,2 | |
| 41 | 1 | 1.5 | 1.5 | 1 | 27.0 | 4.38 | 87.7 | 0.8 | 11.5 | 0.153 |
| 42 | 1 | 2 | 2 | 1 | 29.7 | 5.56 | 82.4 | 0.9 | 16.7 | 0.141 |
| 43 | 1 | 2.5 | 2.5 | 1 | 26.1 | 4.11 | 77.8 | 0.7 | 21.5 | 0.111 |
| 44 | 1 | 3 | 3 | 1 | 21.0 | 3.93 | 71.5 | 0.8 | 27.7 | 0.087 |

TABLE 17-continued

| | Mole ratio of the ingredient of the catalyst component (b) | | | | | | | Microstructure content (%) | | | Gel |
|---|---|---|---|---|---|---|---|---|---|---|---|
| Example | Cobalt octenate | Carbon disulfide | Diethyl amine | Carbon disulfide/ diethyl amine | Yield (g) | [η] | cis-1,4 | trans-1,4 | 1,2 | content (%) |
| 45 | 1 | 3.5 | 3.5 | 1 | 12.0 | 3.58 | 69.9 | 0.6 | 29.5 | 0.050 |
| 46 | 1 | 1.5 | 2 | 0.75 | 26.2 | 4.40 | 84.1 | 1.2 | 14.7 | 0.110 |
| 47 | 1 | 2.5 | 2 | 1.25 | 33.0 | 5.66 | 84.4 | 0.8 | 14.8 | 0.200 |
| 48 | 1 | 2 | 1.5 | 1.33 | 30.0 | 5.03 | 88.7 | 0.8 | 10.5 | 0.272 |
| 49 | 1 | 2 | 2.5 | 0.8 | 25.3 | 4.22 | 80.0 | 0.7 | 19.3 | 0.126 |

EXAMPLES 50-54

1,3-Butadiene was polymerized in the same way as in Example 39 except that the mole ratio of cobalt octenate, carbon disulfide and diethylamine of the catalyst component (b) was changed to 1:3:3, and the time spent for reacting the ingredients of the catalyst component (b) was changed as indicated in Table 18. The results are shown in Table 18.

TABLE 18

| Example | Reaction time for the catalyst component (b) | Amount yielded (g) | [η] | Microstructure content (%) | | | Gel content (%) |
|---|---|---|---|---|---|---|---|
| | | | | cis-1,4 | trans-1,4 | 1,2 | |
| 50 | 15 min. | 21.0 | 3.60 | 74.8 | 1.2 | 24.0 | 0.145 |
| 51 | 4 hrs. | 20.8 | 3.67 | 71.5 | 0.5 | 28.0 | 0.092 |
| 52 | 24 hrs. | 21.0 | 3.93 | 71.5 | 0.8 | 27.7 | 0.080 |
| 53 | 3 days | 22.5 | 5.16 | 74.3 | 0.7 | 25.0 | 0.151 |
| 54 | 6 days | 20.2 | 4.80 | 78.0 | 1.0 | 21.0 | 0.101 |

EXAMPLE 55

1,3-Butadiene was polymerized in the same way as in Example 44 except that the catalyst component (b) was added at 30° C. and the polymerization temperature was changed to 30° C. There was obtained 10.3 g of polybutadidne having an [η] of 6.32, a cis-1,4 microstructure content of 58.2, a trans-1,4 microstructure content of 0.5% and a 1,2 microstructure content of 41.3%.

EXAMPLE 56

1,3-Butadiene was polymerized in the same way as in Example 39 except that in the preparation of the catalyst component (b), cobalt tris-acetylacetonate was used instead of cobalt octenate. There was obtained 24.6 g of polybutadiene having an [η] of 4.50, a cis-1,4 microstructure content of 84.1%, a trans-1,4 microstructure content of 1.1% and a 1,2 microstructure content of 14.8%.

EXAMPLE 57

1,3-Polybutadiene was polymerized in the same way as in Example 44 except that in the preparation of the catalyst component (b), anhydrous cobalt chloride in powder form was used instead of cobalt octenate. There was obtained 19.3 g of polybutadiene having an [η] of 3.55, a cis-1,4 microstructure content of 78.9%, a trans-1,4 microstructure content of 0.9% and a 1,2 microstructure content of 20.2%.

EXAMPLE 58

1,3-Butadiene was polymerized in the same way as in Example 39 except that in the preparation of the catalyst component (b), di-n-butylamine was used instead of diethylamine. There was obtained 29.0 g of polybutadiene having an [η] of 4.42, a cis-1,4 microstructure content of 78.2%, a trans-1,4 microstructure content of 0.7% and a 1,2 microstructure content of 21.1%.

COMPARATIVE EXAMPLE 5

(1) To 20 ml of benzene were added 3 ml of a benzene solution of carbon disulfide (0.7 mole/liter) and 3 ml of a benzene solution of diethylamine (0.7 mole/liter). They were reacted with stirring at room temperature (25° C.) for 1 day with stirring to obtain 26 ml of a solution.

(2) The air inside a 1-liter autoclave was replaced by dry nitrogen gas, and 213 ml of dehydrated benzene and 54 g of 1,3-butadiene were put into it. Water (0.36 millimole) was added, and the mixture was stirred at 30° C. for 30 minutes to dissolve water. Then, 0.9 millimole of diethyl aluminum monochloride was added. The temperature was raised to 60° C., and 0.39 ml of the above catalyst solution was added. Finally, 0.0105 millimole of cobalt octenate was added, and the mixture was stirred at 60° C. for 10 minutes to perform polymerization. There was obtained 32.7 g of polybutadiene having an [η] of 6.21, a cis-1,4 microstructure content of 96.3%, a trans-1,4 microstructure content of 1.4% and a 1,2 microstructure content of 2.3%.

EXAMPLES 59-60

The air inside a 1.5-liter autoclave was replaced by dry nitrogen gas, and 710 ml of dehydrated benzene and 180 g of 1,3-butadiene were put into it. A predetermined amount (indicated in Table 19) of water was added, and the mixture was stirred at 30° C. for 30 minutes to dissolve water. Then, 4 millimoles of diethylaluminum monochloride and 46 millimoles of 1,5-cyclooctadiene were added. The temperature was raised to 60° C., and 20 ml (0.070 millimole based on cobalt octenate) of the catalyst component (b) solution used in Examples 38 to 40 was added, and the mixture was stirred at 60° C. for 30 minutes.

After the polymerization, 15 ml of methanol containing a small amount of 2,6-di-t-butyl-p-cresol was added to the reaction mixture to stop the polymerization. The solution was added to 1 liter of methanol to precipitate the resulting polymer. The polymer was dried at room temperature under reduced pressure for 24 hours.

The microstructure content, inherent viscosity and gel content of the resulting polymer were measured, and the results are shown in Table 19.

TABLE 19

| Example | Water (millimoles) | Amount yielded (g) | [η] | Microstructure content (%) | | | Gel content (%) |
|---|---|---|---|---|---|---|---|
| | | | | cis-1,4 | trans-1,4 | 1,2 | |
| 59 | 1.00 | 49.5 | 2.22 | 84.0 | 0.8 | 15.2 | 0.060 |
| 60 | 1.33 | 52.1 | 2.40 | 78.3 | 0.7 | 21.0 | 0.085 |

EXAMPLES 61–62 AND COMPARATIVE EXAMPLES 6–7

Using the polybutadienes produced in Examples 36 and 37, high-impact polystyrene resins were produced and tested by the same methods as in Examples 29–31.

For comparison, high-impact polystyrene resins were also produced and tested by using commercial high cis polybutadiene rubber (high cis BR: cis-1,4 microstructure content 95.1%, trans-1,4 microstructure content 2.5%, 1,2 microstructure content 2.4%, [η]=2.0) and commercial low cis polybutadiene rubber (low cis BR: cis-1,4-microstructure content 31.7%, trans-1,4 microstructure 54.9%, 1,2 microstrucure content 13.4%, [η]=1.9).

The results are shown in Table 20.

TABLE 20

| Example | Rubber used | Izod impact strength (notched) (kg-cm/cm) | Du Pont impact strength (kg-cm) |
|---|---|---|---|
| 61 | Example 36 | 8.9 | 26 |
| 62 | Example 37 | 8.6 | 25 |
| Comp. Ex. 6 | High cis BR | 8.6 | 19 |
| Comp. Ex. 7 | Low cis BR | 7.8 | 20 |

All of the above molded articles had a good appearance.

EXAMPLES 63–64 AND COMPARATIVE EXAMPLES 8–9

A high-impact polystyrene resin was produced by a continuous bulk method from the polybutadiene obtained by this invention, and then tested for impact strength.

First-stage polymerization was carried out continuously in a 300 ml polymerization vessel equipped with a stirrer, thermometer, reflux condenser, ribbon heater, gas introducing inlet, styrene solution supply opening and polymer solution withdrawing opening. Specifically, the polymerization vessel was purged with nitrogen gas, and fed with a styrene solution containing 6% by weight of each of the rubbers indicated in Table 21 and 0.02% by weight of laurylmercaptan at a rate of 1 ml/ml. While the polymerization was performed at a temperature of 110° C., the polymer solution was extruded at a rate of 1 ml/min. and pooled in a reservoir. When the residence time was adjusted to 3 to 3.5 hours, the conversion was about 30 to 35%.

Three hundred grams of the first-stage polymer solution was transferred to a bottle (360 ml). The inside of the bottle was purged with nitrogen gas, and the polymerization was carried out at 125° C. for 2 hours, at 135° C. for 2 hours, at 145° C. for 2 hours, at 160° C. for 2 hours, and finally at 180° C. for 2 hours.

The final polymer was molded into a sheet by a hot press, dried in a vacuum dryer to remove the volatile matter, and pelletized. The pelletized sample was tested for impact strengths, and the results are shown in Table 21.

TABLE 21

| Example | Rubber used | | | | | | Izod impact strength (notched; kg-cm/cm) | Du Pont impact strength (kg-cm) |
|---|---|---|---|---|---|---|---|---|
| | Type | Microstructure content (%) | | | [η] | Gel content (%) | | |
| | | cis-1,4 | trans-1,4 | 1,2 | | | | |
| 63 | HVP-1 | 86.6 | 0.9 | 12.5 | 2.2 | 0.013 | 10.8 | 33 |
| 64 | HVP-2 | 82.5 | 0.7 | 16.8 | 2.0 | 0.010 | 10.5 | 33 |
| CEx. 8 | High cis BR | 95.1 | 2.5 | 2.4 | 2.0 | 0.010 | 10.9 | 28 |
| CEx. 9 | Low cis BR | 32.3 | 55.7 | 12.0 | 1.9 | 0.020 | 9.4 | 31 |

What is claimed is:

1. A process for producing polybutadiene of a high degree of polymerization having high 1,2 and cis-1,4 microstructure contents and a low trans-1,4 microstructure content, which comprises polymerizing 1,3-butadiene at a temperature of from 5° C. to 80° C. in the presence of a catalyst system composed of (1) a halogen-containing organoaluminum compound, (2) the reaction product of carbon disulfide, a secondary amine and a cobalt compound wherein the mole ratio of carbon disulfide to the secondary amine is from 1:1 to 1:6 and the mole ratio of the secondary amine to carbon disulfide is 1:at least 0.5, and (3) water, wherein said catalyst system is prepared by contacting (2) the reaction product with (1) the halogen-containing organoaluminum compound (i) in the presence of 1,3-butadiene or (ii) in the absence of 1,3-butadiene at a temperature of not more than 50° C. with a contact time of up to 5 minutes to form polybutadiene having (A) 1,2-microstructure content of 7 to 50%, (B) a cis-1,4 microstructure content of at least 50%, (C) a trans-1,4-microstructure content of at most 5%, (D) an inherent viscosity, measured in toluene at 30° C., of at least 1, and (E) a gel content of at most 0.3%.

2. The process of claim 1 wherein the halogen-containing organoaluminum compound (1) is represented by the following general formula (I)

$$AlR_nX_{3-n} \qquad (I)$$

wherein R represents an alkyl group having 1 to 8 carbon atoms, a cycloalkyl group or a phenyl alkyl group, X represents a halogen atom, and n is a number of 1.5 to 2.

3. The process of claim 1 wherein in the preparation of the catalyst system, at least the halogen-containing organoaluminum compound (1) and the reaction product of carbon disulfide, the secondary amine and the cobalt compound are contacted in the presence of 1,3-butadiene.

4. The process of claim 1 wherein the halogen-containing organoaluminum compound (1) is selected from the group consisting of diethylaluminum monochloride, diethylaluminum monobromide, diisobutylaluminum monochloride, and ethylaluminum sesquichloride.

5. The process of claim 1 wherein the secondary amine is a compound selected from the group consisting of dimethylamine, diethylamine, dipropylamine, dibutylamine, dihexylamine, dioctylamine, piperidine and pipecoline, and the cobalt compound is selected form the group consisting of cobalt acetate, cobalt octenate, cobalt naphthenate, cobalt stearate, cobalt tris-acetylacetonate, cobalt bis-acetylacetonate, cobalt chloride, cobalt bromide, cobalt iodide, cobalt nitrate and cobalt carbonate.

6. The process of claim 5 wherein the mole ratio of the cobalt compound to the secondary amine is from 1:1 to 1:4 and the mole ratio of the secondary amine to carbon disulfide is from 1:0.5 to 1:5.

7. The process of claim 1 wherein the catalyst system is used in an amount such that the component (2) is present in an amount of 0.001 to 0.5 millimoles, as cobalt, per mole of 1,3-butadiene and the mole ratio of cobalt from the component (2) to the halogen-containing organoaluminum compound (1) is from 1:5 to 1:2,000.

8. The process of claim 7 wherein the mole ratio of cobalt to the halogen-containing organoaluminum compound (1) is from 1:5 to 1:1,000.

9. The process of claim 1 wherein the mole ratio of water to the halogen-containing organoaluminum compound (1) is from 0.01:1 to 0.7:1.

10. The process of claim 1 wherein the mole ratio of water to the halogen-containing organoaluminum compound (1) is from 0.1:1 to 0.6:1.

11. The process of claim 1 wherein the polymerization temperature is from 20° to 70° C.

* * * * *